United States Patent
Bauchot et al.

(10) Patent No.: US 8,199,887 B2
(45) Date of Patent: Jun. 12, 2012

(54) PHONE CALL MANAGEMENT

(75) Inventors: Frederic J. Bauchot, Saint-Jeannet (FR); Gerard Marmigere, Drap (FR); Joaquin Picon, St. Laurent du Var (FR); Pierre Secondo, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 12/243,001

(22) Filed: Oct. 1, 2008

(65) Prior Publication Data

US 2010/0074420 A1 Mar. 25, 2010

(30) Foreign Application Priority Data

Sep. 22, 2008 (FR) .................. 08305579.8

(51) Int. Cl.
*H04M 1/64* (2006.01)
(52) U.S. Cl. ............. 379/88.02; 379/88.01; 379/207.15; 379/211.01; 455/414.1
(58) Field of Classification Search ............... 379/88.01, 379/88.02, 207.15, 211.01; 455/414.1
See application file for complete search history.

(56) References Cited

U.S. PATENT DOCUMENTS

| | | | | |
|---|---|---|---|---|
| 7,027,579 | B1 * | 4/2006 | McDonald et al. | 379/211.01 |
| 2007/0160186 | A1 * | 7/2007 | Wang | 379/207.15 |
| 2008/0144782 | A1 * | 6/2008 | Chou | 379/88.01 |
| 2008/0254776 | A1 * | 10/2008 | Ma | 455/414.1 |

* cited by examiner

*Primary Examiner* — Fan Tsang
*Assistant Examiner* — Van D Huynh
(74) *Attorney, Agent, or Firm* — Cantor Colburn LLP; Jean Sullivan

(57) ABSTRACT

A method of operating a phone is provided and includes receiving input to set a phone in a do-not disturb mode and to set a time period during which the do-not-disturb mode is activated and setting the phone accordingly, upon reception of an incoming call from a caller during the time period, activating a caller ID function of the phone, detecting a caller ID of the caller and searching for the caller ID in black- and white-lists. In an event the caller ID of the caller is stored in the blacklist, the voicemail function is activated or the incoming call is ended. In an event the caller ID of the caller is stored in the whitelist, an input of the password associated with the caller ID is requested, and, in an event the caller inputs the password, the ringing function is activated.

7 Claims, 5 Drawing Sheets

State with Silent_Autoanswer disabled

State with Silent_Autoanswer disabled

State with Silent_Autoanswer enabled

Contact entry

PHONE CALL MANAGEMENT

CLAIM OF PRIORITY

This application claims the benefit of Application No. 08305579.8, filed in France on Sep. 22, 2008 and incorporated herein in its entirety.

BACKGROUND

Aspects of the present invention are directed to a phone call management system and a method of operating a phone call management system.

In general, systems that provide users with phone call management capabilities include blacklist mechanisms. Typically, blacklist mechanisms allow a user of a phone to program the phone to return specific ring tones to particular callers when the blacklist mechanism is activated in order to signal that the call is not authorized to the caller. The ring tones may be embodied as sound or music files, which are generally stored in .wav or .mp3 format. Among the drawbacks of the systems supporting blacklist mechanisms, is the fact that the decision to activate the blacklist mechanism is typically a binary one. That is, either a phone call is to be authorized or is not to be authorized.

In fact, it is seen that many of the features of modern phones have binary activation and/or otherwise inflexible features. These include call filtering features, number integration features, in which the user rejects all calls that contain a sequence of numbers in the caller identification (ID), "Reject All" modes and whitelist features which enable users to give some phone numbers priority to be accepted.

SUMMARY

In accordance with an aspect of the invention, a method of operating a phone configured to allow a user to communicate with a caller, to perform ringing, voicemail, caller identification (ID) and timing functions and to process, store and display information including passwords and black- and white-lists, in each of which caller IDs, to which the passwords are associated, are stored, is provided and includes receiving input from the user to set the phone in a do-not disturb mode and to set a time period during which the do-not-disturb mode is activated and setting the phone accordingly, upon reception of an incoming call from the caller by the phone during the time period, activating the caller ID function of the phone, detecting a caller ID of the caller and searching for the caller ID in the black- and white-lists, in an event the caller ID of the caller is stored in the blacklist, delivering to the caller a message announcing a remaining time until the time period expires and activating the voicemail function to respond to the incoming call or ending the incoming call, in an event the caller ID of the caller is stored in the whitelist, delivering to the caller the message and requesting from the caller an input of the one password associated with the caller ID of the caller, and in an event the caller inputs the one password prior to a timeout instance, activating the ringing function to alert the user to the instance of the incoming call.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Figure 1:
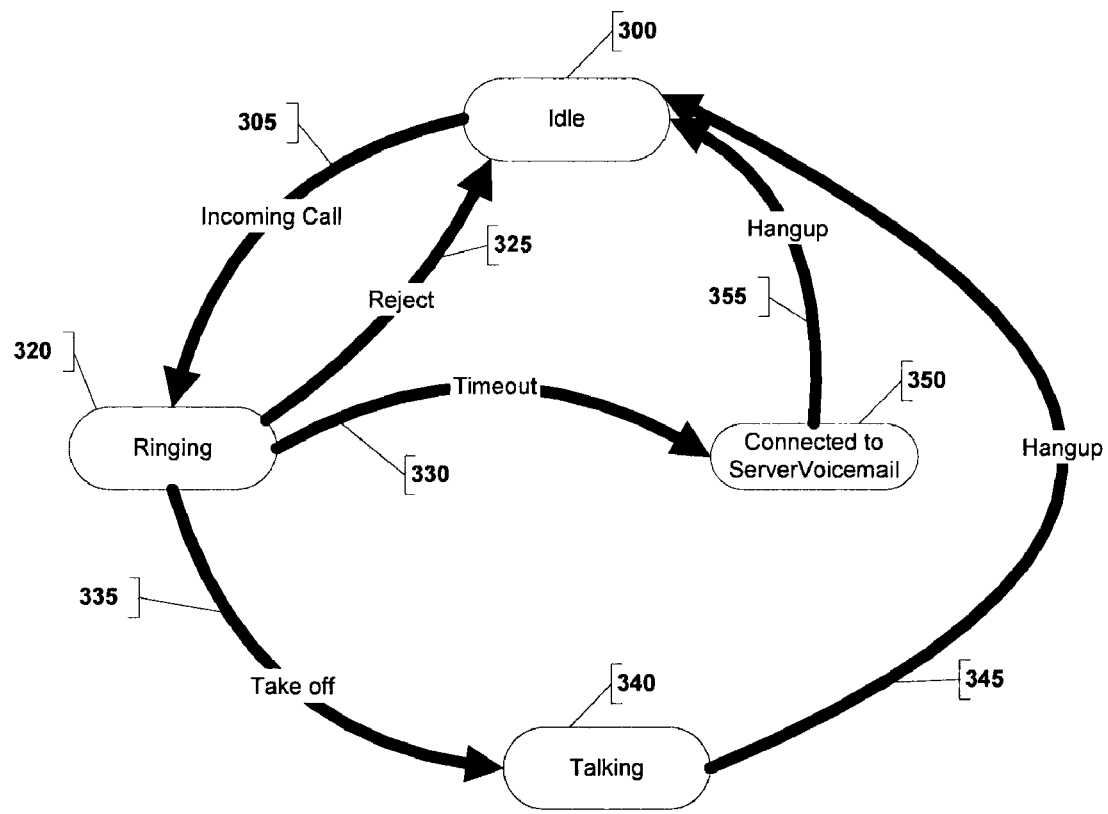
FIG. 1 is a schematic diagram of a performance of a phone operating method that is disabled in accordance with embodiments of the invention.

In accordance with various embodiments of the present invention, a phone may be set by a user thereof to operate in a do-not-disturb mode. In this mode, upon a reception of an incoming call, the caller's identification (ID) is checked against a blacklist. If the caller's ID is found in the blacklist, normal phone functions proceed. For example, the voicemail function of the phone is activated and the caller is directed to communicate therewith. If a whitelist has been defined and the caller's ID is not found in the whitelist, again, the normal phone functions proceed but, in addition to the normal operations, while the phone does not ring, additional forms of communication between the user and the caller are established. For example, a default or personalized voice message based on the caller's ID may be sent to the caller. Further, the caller may be requested to input a password via multi-tone multi-frequency (MTMF) and/or dual-tone multi-frequency (DTMF). If no password is entered before a configurable delay, the call is automatically routed the voicemail of the user. If a password is entered, caller authentication is performed against a contact list. In a case of a matching contact, a configurable rule is applied based on the caller's authentication. An exemplary rule can stipulate that, if the caller is determined to be a member of a family group of the user, then ringing is to be initiated. Upon deactivation of the do-not-disturb mode, the phone switches back to normal behavior.

The features discussed above may be based on the utilization of MTMF or DTMF, as well as phone functionalities that allow for the filtering and reception of selected calls based on the caller authentication.

In accordance with aspects of the invention, with reference to FIGS. 1-5, a method of operating a phone is provided. The phone may be any modern phone, cellular phone, mobile phone, handheld device, personal digital assistant (PDA), etc. As such, the phone may be configured to allow a user to communicate with a caller, to perform ringing, voicemail, caller identification (ID) and timing functions, and to process, store and display information. The information may include, but is not limited to, stored passwords and stored black- and white-lists. Here, each of the black- and white-lists include lists of caller IDs, to which the passwords are associated. The storage of the passwords and the black- and white-lists may be provided by local random access memory (RAM), local read only memory (ROM), remotely stored databases and/or any other similar storage units.

The method includes receiving input from the user to set the phone in a do-not disturb mode and to set a time period during which the do-not-disturb mode is activated and setting the phone accordingly. At this point, upon reception of an incoming call from the caller by the phone during the time period, the caller ID function of the phone is activated, a caller ID of the caller is detected and the caller ID is searched for in the black- and white-lists. If the caller ID of the caller is stored in the blacklist, a message announcing a remaining time until the time period expires is delivered to the caller. In addition, the voicemail function of the phone may be activated to respond to the incoming call or the incoming call may be ended. If, on the other hand, the caller ID of the caller is found to be stored in the whitelist, the message is delivered to the caller and an input of the one password associated with the caller ID of the caller is requested. Here, if the caller inputs the one password, which is received and verified with reference to the stored passwords, prior to a timeout instance, the ringing function of the phone is activated to alert the user to the instance of the incoming call. In addition, the voicemail function may be activated to respond to the incoming call or the incoming call may be ended following a timeout of the ringing function.

In accordance with further embodiments of the invention, the input of the one password may be achieved by the caller having dialed the password and by an application of MTMF and/or DTMF. Alternately, the input may be achieved by the caller vocally expressing the password and by an application of speech-to-text or voice recognition software, by recognition of a biometric signature of a voice of the caller, or by a combination of these and/or other input receiving operations in accordance with rules set by the user.

With particular reference to FIG. 1, it is seen that, when the phone is set with the Silent_Autoanswer disabled (i.e., the phone is not set in the do-not-disturb mode), the phone normally operates in an idle mode (300). When an incoming call is received (305), the phone rings (320). At this point, the incoming call can be rejected (325), timed-out (330) or answered (335). If the ringing is timed-out, the caller is connected to the voicemail function of the phone (350) and, then, once the voicemail function is completed, the phone automatically hangs up (355). If the call is answered, communications occur (340) and, then, a hang up occurs (345).

Figure 2:
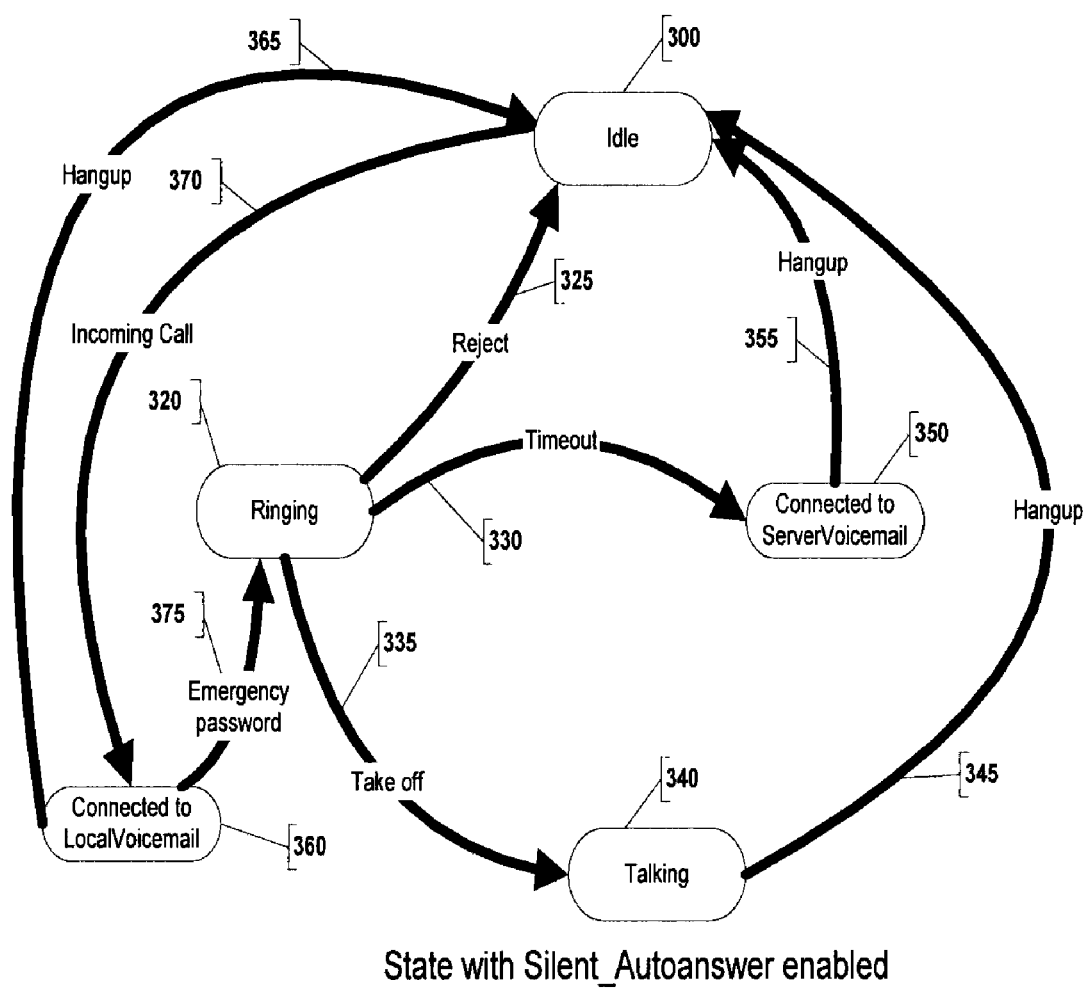
FIG. 2 is a schematic diagram of a performance of a phone operating method that is enabled in accordance with embodiments of the invention.

Alternatively, with reference to FIG. 2, it is seen that, when the phone is set with the Silent_Autoanswer enabled (i.e., the phone is set in the do-not-disturb mode), the operations of the phone are changed. For example, upon an instance of a received incoming call (370), if the caller ID of the incoming call is listed on a blacklist of the phone, the call may be rejected and the phone hung up (365). If, however, the caller ID is found in a whitelist of the phone, the phone requests from the caller an input of a password (360). If the password is inputted (375) by the caller because, e.g., the caller is aware of an emergency and knows the password, the phone will ring (320) and operationally proceed as discussed above.

Figure 3:
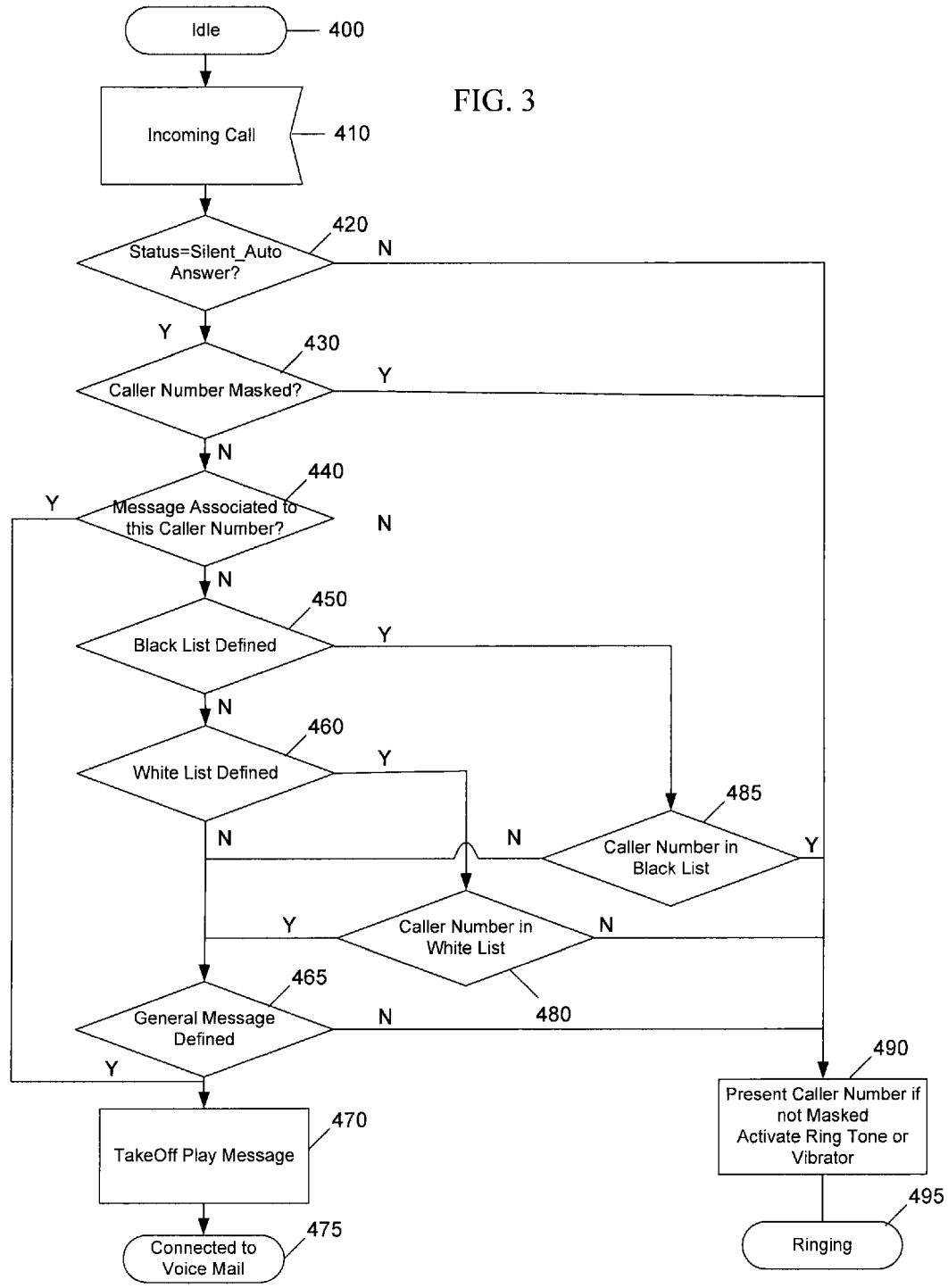
FIG. 3 is a flow chart of a method of operating a phone in accordance with embodiments of the invention.

With reference to FIG. 3, it is noted that FIG. 3 is a flow chart of a method of operating a phone in accordance with embodiments of the invention and depicts the testing and operations of the phone before a call is connected to the local voicemail and shows that, if criteria are not met, default behaviour of the phone mimics a normal silent mode thereof.

In detail, the phone is initially idle (400) until an incoming call is received (410). At this point, it is determined whether the phone is set with the Silent_Autoanswer mode enabled (420). If the Silent_Autoanswer mode is not enabled, the caller ID is presented (490) and the ringer or vibrator of the phone is engaged (495). If the Silent_Autoanswer mode is enabled, it is determined whether the caller ID of the caller is masked (430). If the caller ID is masked, control proceeds to operations 490 and 495. If the caller ID is not masked, it is determined whether a message to be delivered to the caller exists (440). If such a message exists, it is played to the caller (470) who is then connected to voicemail (475).

If no such message exists, it is determined if a blacklist is defined (450) and, if so, whether the caller ID is listed therein (485). If the caller ID is listed in the blacklist, control proceeds to operations 490 and 495 and, if the caller ID is not listed in the blacklist, it is determined whether a general message is defined (465). If a general message is defined, it is played to the caller (470) and the caller is connected to voicemail (475). If no general message is defined, control proceeds to operations 490 and 495.

If a blacklist is not defined, it is determined whether a whitelist is defined (460). If no such whitelist is defined, control proceeds to operations 465, 470 and 475. If a whitelist is defined, it is determined if the caller ID is listed therein. If the caller ID is listed therein, control proceeds to operations 465, 470 and 475. If the caller ID is not listed in the whitelist, control proceeds to operations 490 and 495.

Figure 4:
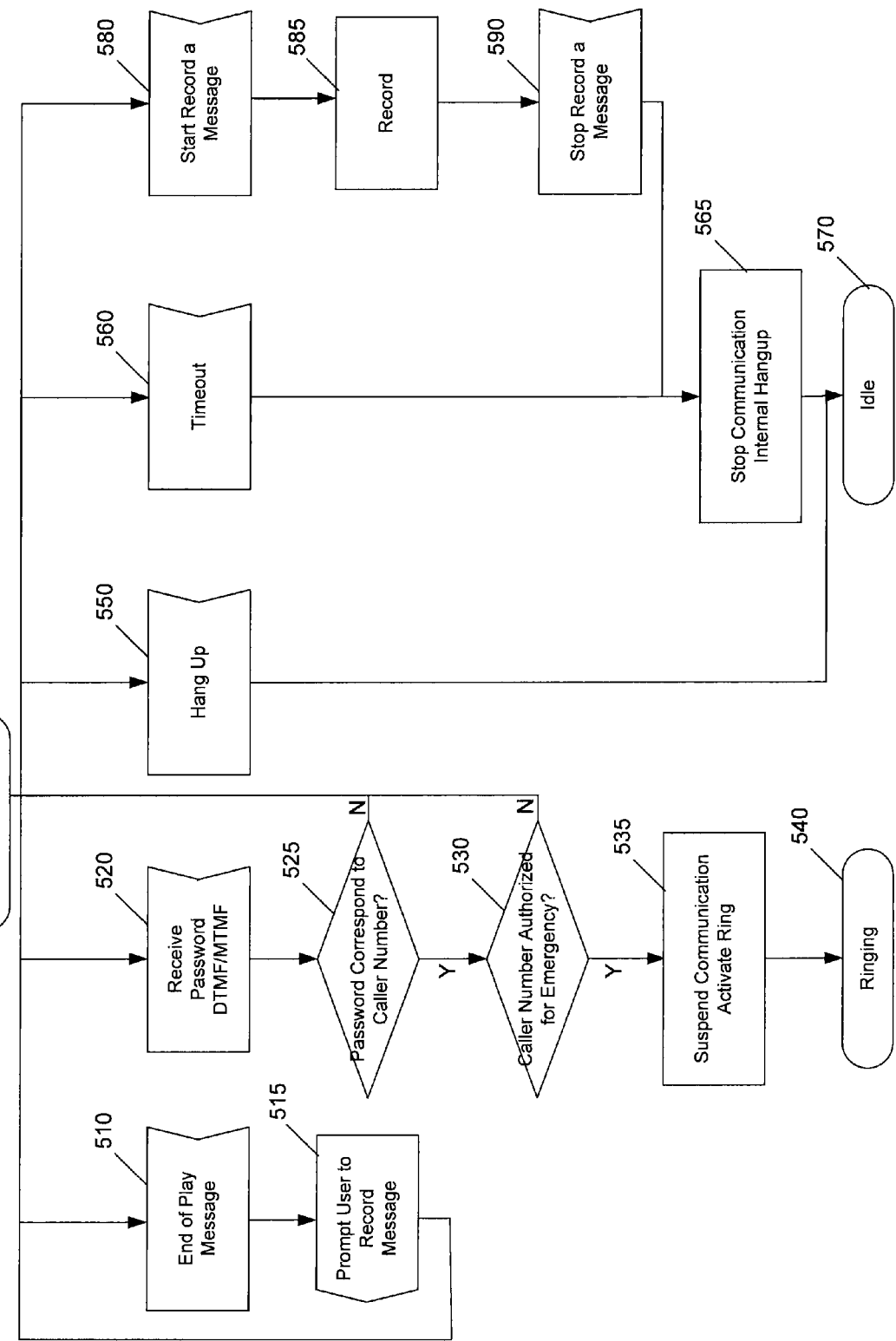
FIG. 4 is a diagram of possible outcomes of a performance of the method of FIG. 3.

With reference to FIG. 4, the possible outcomes of a caller connecting with a local voicemail, in accordance with embodiments of the present invention, are provided. As shown, once the caller is connected to voicemail (500), a recorded message may be played to him (510) and he may be prompted to record a message (515). Alternately, the caller may input a password which is received by way of DTMF/MTMF (520), at which point it is determined whether the password matches his caller ID information (525) and whether the caller is authorized to be connected to the user in an emergency (530). If so, communications are suspended and the ringing of the phone is activated (535, 540). If either determination is a negative, control returns to 500. If the caller hangs up (550), the phone is idled (570). Similarly, if a timeout occurs, communications are ended by an internal hang-up (565) and the phone is idled (570). Still further, if the caller records a message (580, 585, 590), communications are ended by an internal hang-up (565) and the phone is idled (570).

Figure 5:
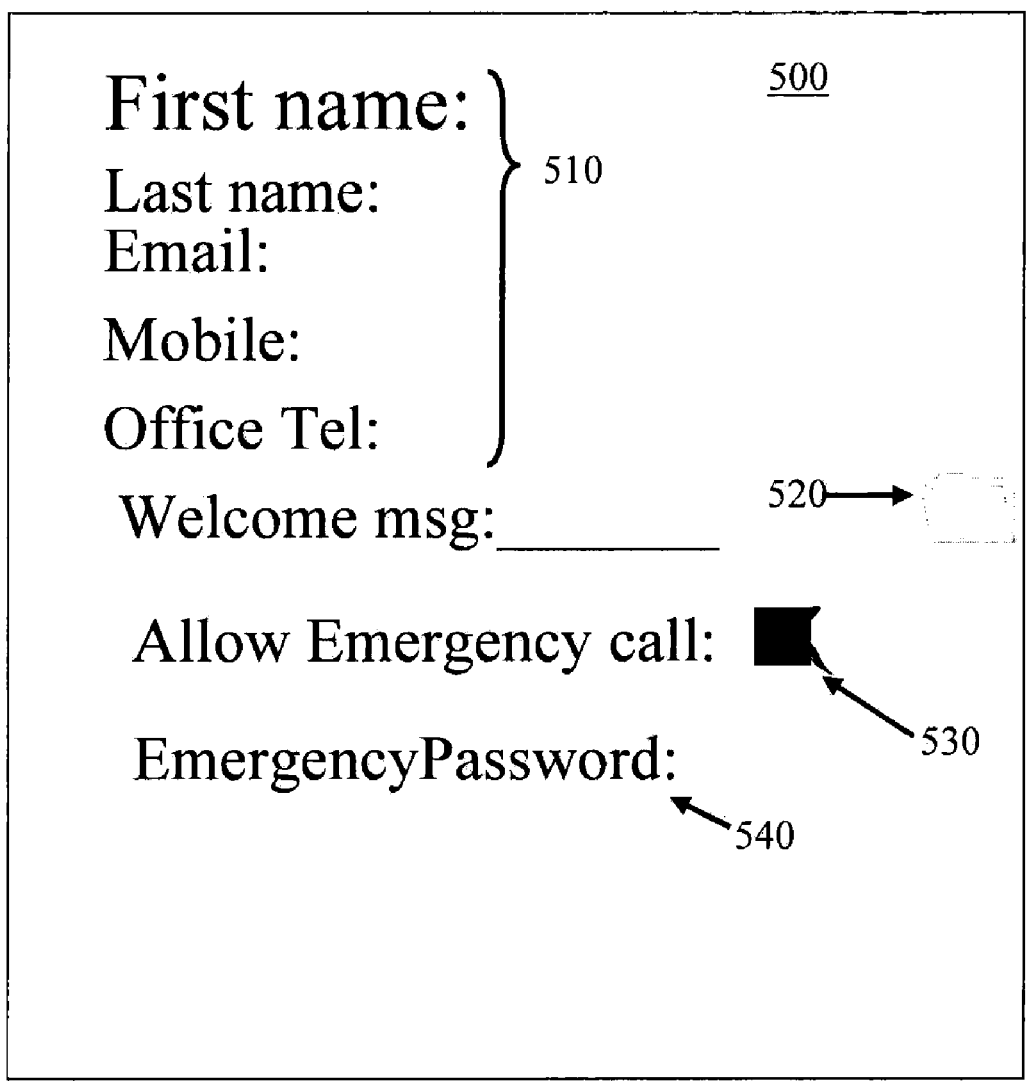
FIG. 5 is an exemplary contact entry screen of a graphical user interface (GUI) for use with the method of FIG. 3.

With reference to FIG. 5, it is seen that a phone, having executable instructions stored therein to carry out the methods described above, includes a display unit, such as a liquid crystal display, and a processing unit, which is configured to generate a graphical user interface (GUI/UI) to be displayed to a user of the phone by way of the display unit. The GUI may have multiple screens and may present multiple options to the user. Among these is a contact entry screen 500 that includes various fields 510 for contact name, email and phone number entry. In addition, the contact entry screen 500 includes a folder link 520 that allows the user to access pre-recorded messages for the contact to receive, a button field 530 that allows the user to authorize the contact to be connected to the user in an emergency and a password field 540 that allows the user to enter a password for the contact.

In accordance with another aspect of the invention, a phone, such as a mobile or cellular phone, is provided. The phone includes a communication unit that is configured to allow a user to communicate with another person, such as a caller or a callee, during incoming and outgoing phone calls, a ringer to ring to alert the user to an incoming phone call when the phone is set to respond in that manner, a storage unit, including random access memory (RAM) and read-only memory (ROM), to allow for the performance of voicemail operations (e.g., the storing of messages by the user and the recording of messages by callers for the user), and an input unit, such as a touch- or key-pad by which the user enters information into the storage unit. The phone is further configured to perform caller identification (ID) operations and is capable of timing periods of time. In addition, the phone is also configured to process, store and display information including passwords and black- and white-lists, in each of which caller IDs, to which the passwords are associated, are stored.

In this capacity, the phone receives input from the user to set the phone in a do-not disturb mode and to set a time period during which the do-not-disturb mode is activated and setting the phone accordingly. Upon a reception of an incoming call from the caller by the phone during the time period, the caller ID function of the phone is activated to thereby detect a caller ID of the caller and to allow for a searching for the caller ID in the black- and white-lists.

If the caller ID of the caller is stored in the blacklist, a message announcing a remaining time until the time period expires is delivered to the caller and the voicemail function to respond to the incoming call is activated or the incoming call is ended. If the caller ID of the caller is stored in the whitelist, the message is delivered to the caller and an input of the one password associated with the caller ID of the caller is requested from the caller. If the caller inputs the one password prior to a timeout instance, the ringing function of the phone is activated to alert the user to the instance of the incoming call.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method of operating a phone configured to allow a user to communicate with a caller, to perform ringing, voicemail, caller identification (ID) and timing functions and to process, store and display information including passwords blacklists and whitelists, in each of which caller IDs, to which the passwords are associated, are stored, the method comprising:

receiving input from the user to set the phone in a do-not disturb mode and to set a time period during which the do-not-disturb mode is activated and setting the phone accordingly;

upon reception of an incoming call from the caller by the phone during the time period, activating the caller ID function of the phone, detecting a caller ID of the caller and searching for the caller ID in the blacklists and whitelists;

in an event the caller ID of the caller is stored in the blacklist, delivering to the caller a message announcing a remaining time after detecting the expiration of said time period and activating the voicemail function to respond to the incoming call or ending the incoming call;

in an event the caller ID of the caller is stored in the whitelist, delivering to the caller the message and requesting from the caller an input of the one password associated with the caller ID of the caller; and in an event the caller inputs the one password prior to a timeout instance, activating the ringing function to alert the user to the instance of the incoming call.

2. The method according to claim 1, further comprising activating the voicemail function to respond to the incoming call or ending the incoming call following a timeout of the ringing function.

3. The method according to claim 1, wherein the input of the one password is achieved by the caller dialing the password.

4. The method according to claim 1, wherein the input of the one password is achieved by the caller vocally expressing the password.

5. The method according to claim 1, wherein the input of the password is achieved by recognition of a biometric signature of a voice of the caller.

6. The method according to claim 1, wherein the input of the password is achieved in accordance with rules set by the user.

7. The method according to claim 1, further comprising:
receiving an input from the caller in response to the request of the input of the one password; and
comparing the input from the caller with the stored passwords.

* * * * *